Dec. 11, 1945.   H. S. AUSHERMAN   2,390,680
FEEDING MECHANISM FOR THRESHING COMBINES
Filed April 10, 1944   3 Sheets-Sheet 1
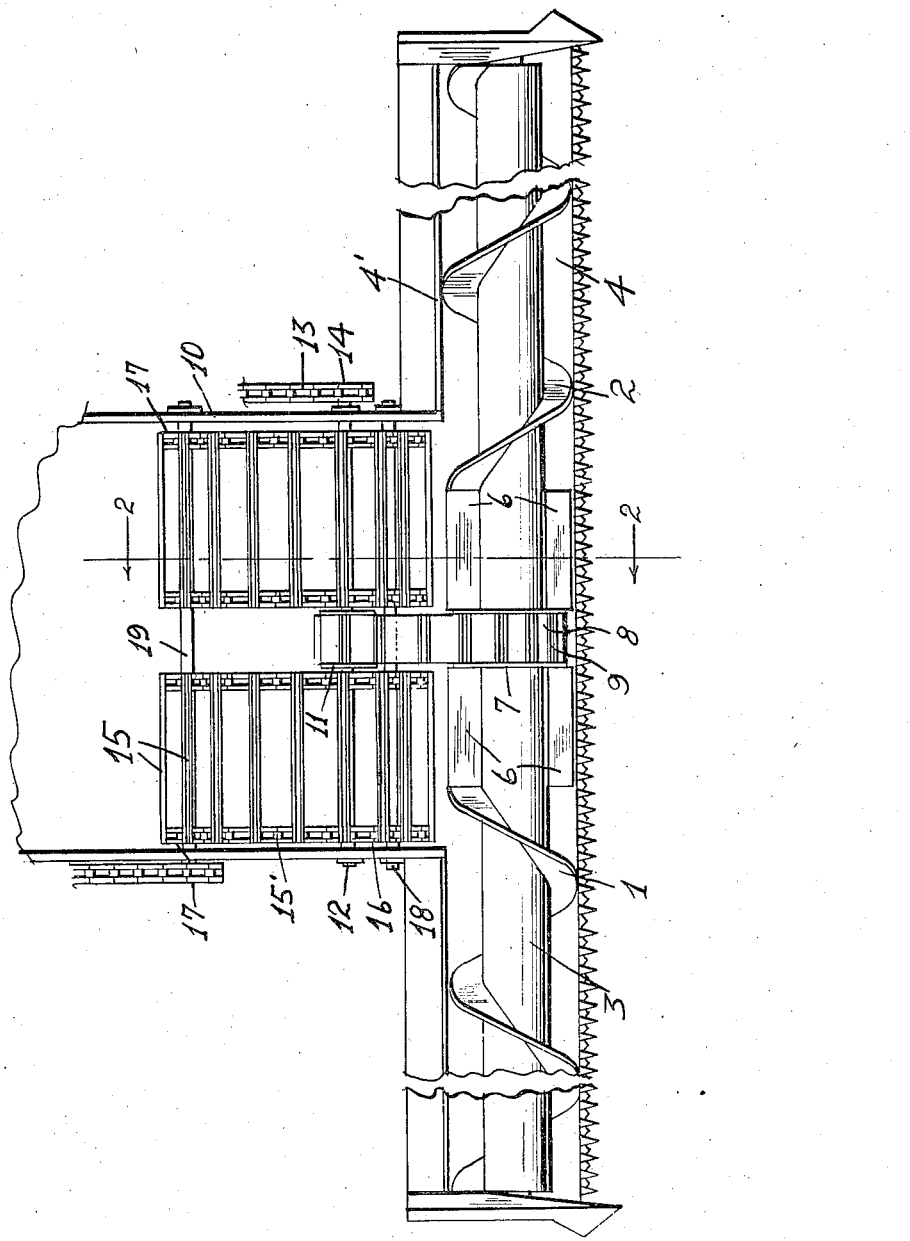
INVENTOR.
HARRY S. AUSHERMAN.
BY U. G. Charles
Atty.

Dec. 11, 1945.   H. S. AUSHERMAN   2,390,680
FEEDING MECHANISM FOR THRESHING COMBINES
Filed April 10, 1944   3 Sheets-Sheet 2
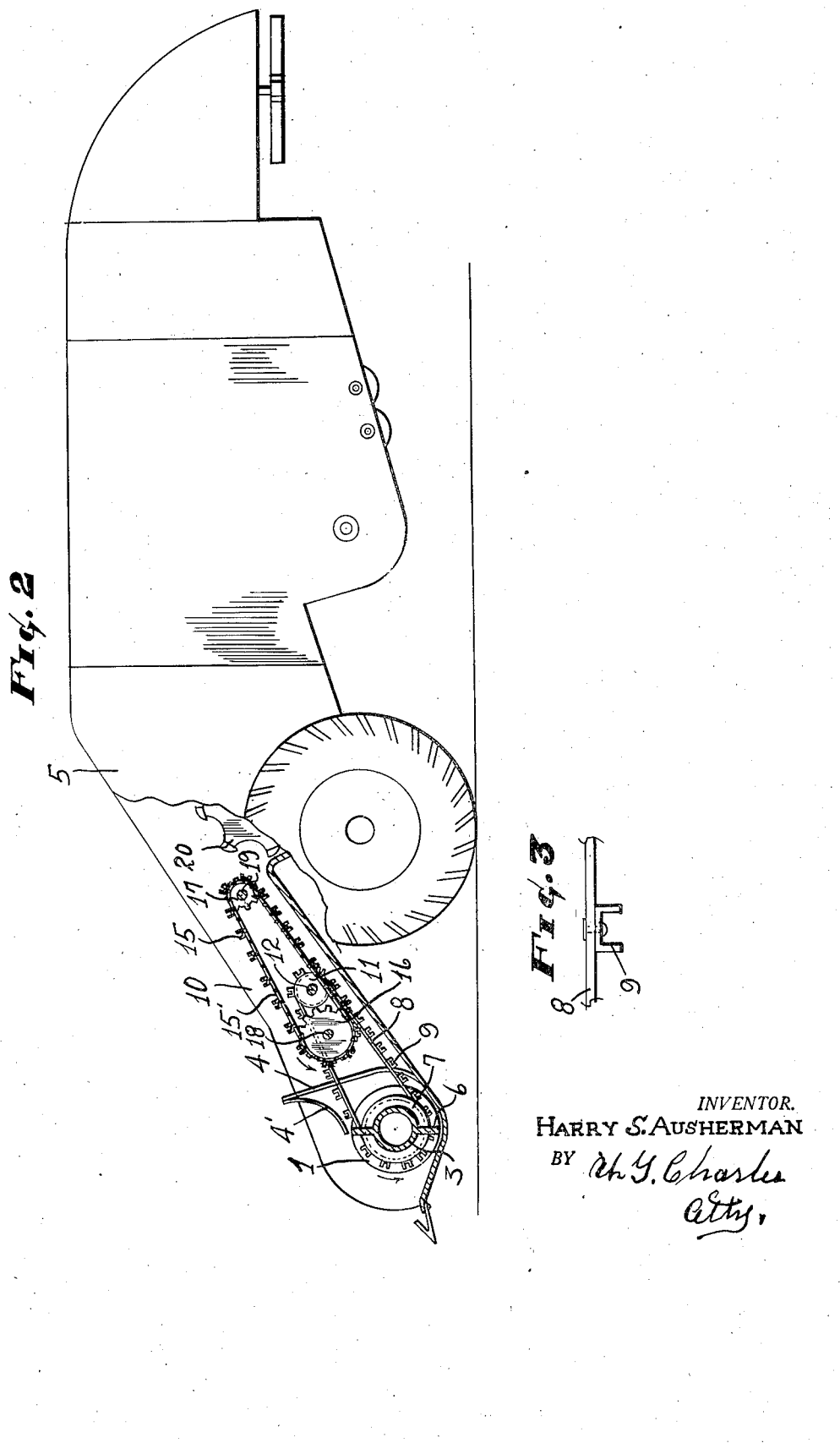
INVENTOR.
HARRY S. AUSHERMAN
BY *[signature]*
Atty.

Dec. 11, 1945. H. S. AUSHERMAN 2,390,680
FEEDING MECHANISM FOR THRESHING COMBINES
Filed April 10, 1944 3 Sheets-Sheet 3
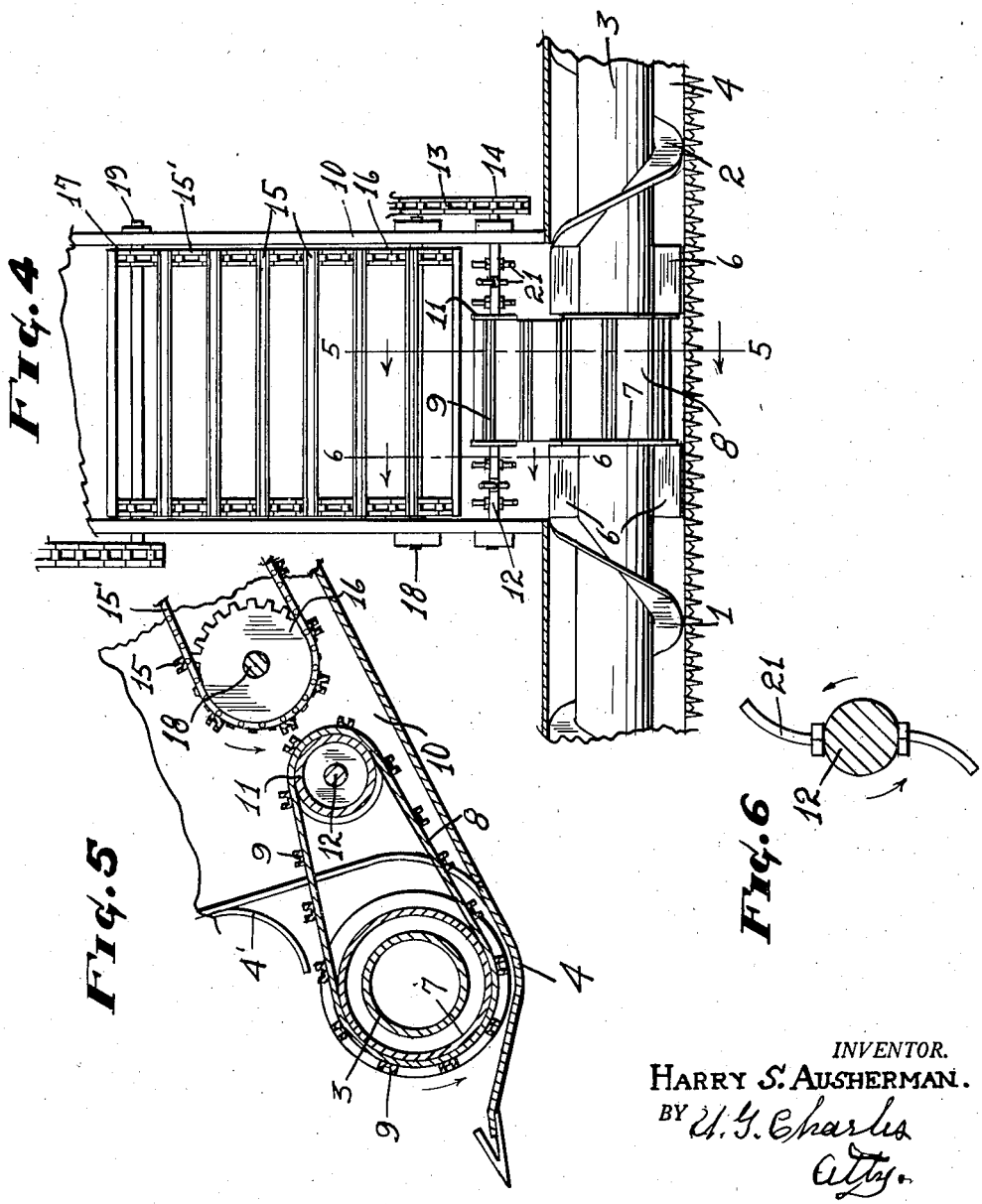
INVENTOR.
HARRY S. AUSHERMAN.

Patented Dec. 11, 1945

2,390,680

UNITED STATES PATENT OFFICE 2,390,680

FEEDING MECHANISM FOR THRESHING COMBINES

Harry S. Ausherman, Wichita, Kans.

Application April 10, 1944, Serial No. 530,412

2 Claims. (Cl. 198—9)

This invention relates to improvements in a feeding mechanism for threshing combines, and has for its principal object the provision of a belt conveyor, or the like, revolving over the platform auger of a combine to direct unthreshed grain or cut straw that has been deposited thereon, to the feeder house, whereby a uniform movement of said unthreshed grain or cut straw is accomplished from the auger.

A further object of this invention is to provide an auger for the platform of a combine wherein a belt conveyor revolves around the auger intermediately of its ends, the auger at its outer ends, or leading ends, beginning with the spirals wound so that the straw, or the like, will be conveyed toward the belt conveyor and from thence into the feeder house of the combine.

These and other objects will hereinafter be more fully explained, reference being had to the accompanying drawings, forming a part of this specification, and in which like characters will apply to like parts in the different views.

Referring to the drawings:

Fig. 1 is a front view of a combine illustrating the invention, the combine being fragmentarily shown.

Fig. 2 is a side view of the combine, the feeder house being in section and taken on line 2—2 in Fig. 1.

Fig. 3 is an edge view of the belt conveyor.

Fig. 4 is a fragmentary front portion of a combine showing a modification of the feeding mechanism.

Fig. 5 is an enlarged sectional view taken on line 5—5 in Fig. 4.

Fig. 6 is an enlarged view taken on line 6—6 in Fig. 4.

This invention consists of a spiral auger comprising portions 1 and 2, the spirals being wound on a tube 3 of the auger, and the spirals of portion 1 and 2 being wound oppositely so that the trailing ends of the auger spirals of said portions confront each other other to convey straw, or the like, toward the center of a circular portion 4 of the platform from both ends thereof and said platform having a plate 4' extending over the auger a spaced distance to avoid a continuous rotation of straw, but rather move the straw along the platform toward its center. It will be understood that the straw as cut in a field will be deposited on the platform in the usual method now being employed.

By the above described arrangement, the threshing or separating portion 5 of the combine may be connected to the platform centrally thereof, providing a compact and well-balanced machine, and in the case of a self-propelled combine no loss of straw, or the like, cut from a field will occur in the first swath of a new field, for the reason that the carrying wheels of the combine may be positioned at the rear of the straw receiving platform, and on each side of the grain separating portion of the combine.

Secured to the tube 3 adjacent the inner end of each of the spirals of said portions 1 and 2 is a pair of plates 6 longitudinally positioned with respect to the tube, one plate of each pair having one of its ends secured to its respective spiral portion of the auger. Positioned between the said set of plates and secured to the tube is a flanged drum 7 around which revolves a belt conveyor consisting of a canvas material 8, or the like, to which is secured channel-like slates 9 to convey straw or unthreshed grain as received from the auger and plates rearward, and furthermore to separate the movement of the straw as it moves theretoward from portions 1 and 2, thereby avoiding the piling up of said straw at the entrance of the feeder house 10.

The belt conveyor 8 slantingly extends upward and revolves over a pulley 11 that is mounted on a shaft 12 that is rotatably carried by the feeder house. Said shaft 12 may be driven by a power actuated chain 13 engaging on sprocket wheel 14, whereby the auger may be rotated through the medium of the belt conveyor; however, the auger may be driven any other suitable way, in which case, the chain 13 above mentioned may be eliminated.

Positioned in the feeder house at the rear of each pair of plates 6 is a slat conveyor, the slats 15 being secured to chains 15' which engage on sprockets 16 and 17 respectively, the sprockets 16 being carried by a shaft 18 while the sprockets 17 are mounted on a power-driven shaft 19.

In operation of the combine, the spirals of the auger will convey the straw to the plates 6, which will, in coaction with the belt conveyor, move the straw along the bottom of the platform to be received by the slat conveyors, and from thence to a threshing cylinder 20.

In Figs. 4, 5, and 6 is shown a modification of the feeding mechanism that eliminates one of the slat conveyors, and the remaining slat conveyor, as well as the belt conveyor, is widened. In this instance, the belt conveyor is reduced in length to be positioned in front of the slat conveyor instead of being positioned between the slat conveyors as illustrated in Fig. 1. Also a series of arced fingers 21 are mounted on the shaft 12 to assist in the movement of straw toward the slat conveyor, and such other modifications may be made as lie within the scope of the appended claims.

Having fully described my invention what I claim as new and desire to secure by Letters Patent is:

1. In a feeding mechanism for a threshing combine of the class described comprising a trough rearward of a cutting sickle, an auger positioned in the trough and power means to turn the auger, said auger comprising a tubular shaft having spirally wound vanes to convey straw from its ends toward the center of the auger, said vanes terminating at their inner ends with plate-like elements radially extending and being in parallelism with the worm shaft, the confronting ends of said plates being spaced apart, a flanged drum secured to the auger shaft, said drum being between the confronting ends of said plate-like elements, a feeder house having side walls and a bottom slanting upward and extending rearward from the trough and communicating therewith, the width of the house from wall to wall being equal to the length of the drum and both adjoining plates combined, a fingered shaft, and a flanged pulley secured to the last named shaft at its longitudinal center while the fingers are staggered and positioned in spaced relation along the shaft each way from the pulley, said fingered shaft being journalled in the side walls adjacent the auger, and power means to turn the fingered shaft, a belt conveyor engaging on the flanged drum and pulley and a slat conveyor extending across from wall to wall of the feeder house, said slat conveyor having chain belts for the sides thereof to be engaged by sprocket wheels that are mounted on a pair of shafts, said shafts being journalled in the side walls of the feeder house, and power means to rotate one of last said shafts which in turn rotates the other shaft all as and for the purpose specified.

2. In a feeding mechanism for a threshing combine as recited in claim 1, the auger trough having a rear upwardly extending wall, and an arcuate plate secured to said wall and extending partially over the auger with respect to its turning axis.

HARRY S. AUSHERMAN.